March 24, 1931. L. J. GRUBMAN 1,797,415

EYE MOUNTING FOR DOLLS

Filed Dec. 21, 1928

INVENTOR
Leo J. Grubman
BY
his ATTORNEY

Patented Mar. 24, 1931

1,797,415

UNITED STATES PATENT OFFICE

LEO J. GRUBMAN, OF BELLE HARBOR, NEW YORK

EYE MOUNTING FOR DOLLS

Application filed December 21, 1928. Serial No. 327,604.

This invention relates to eye mountings for dolls, and has for its primary object and purpose to provide an oscillatory eye mounting of that type in which the spaced eye members are adapted for rocking engagement with internal seats formed on the wall structure of the doll head adjacent to the respective eye openings and embodying a pendulum frame having relatively movable parts carrying the respective eye members and weight means for oscillating said frame and acting by gravity to move said parts relatively to each other in one direction and urge the eye members into operative engagement upon said seats.

It is also another object of the invention to provide means for effectively locking said parts of the eye mounting against movement with respect to each other in a direction which would permit of the movement of the eye members out of supporting contact with the seats on the head wall.

It is also a further general object of the invention to provide an eye setting of the above type particularly designed for use in connection with glass eye members and in which the eye setting may be readily inserted within the doll head and the parts thereof moved to position the eye members upon the supporting seats by the use of one hand, after the head has been completely closed.

With the above and other objects in view, the invention consists in the improved eye mounting for dolls and in the form, construction and relative arrangement of the several parts as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views.

Figure 1:
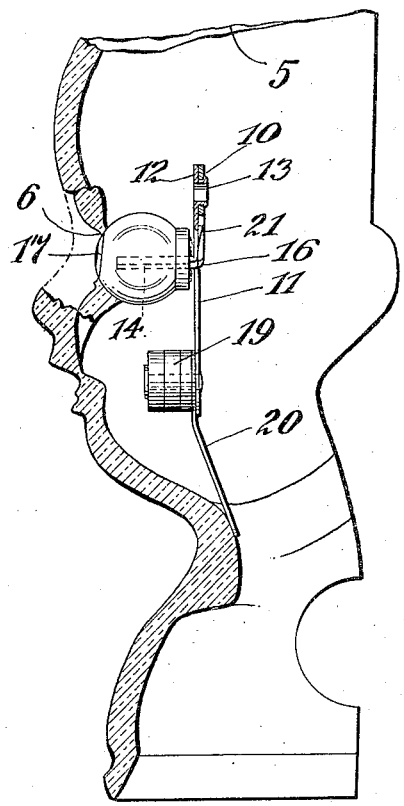
Figure 1 is a vertical sectional view through the front portion of a doll head showing my improved eye mounting arranged therein, said section being taken substantially on the line 1—1 of Fig. 2.
Figure 2:
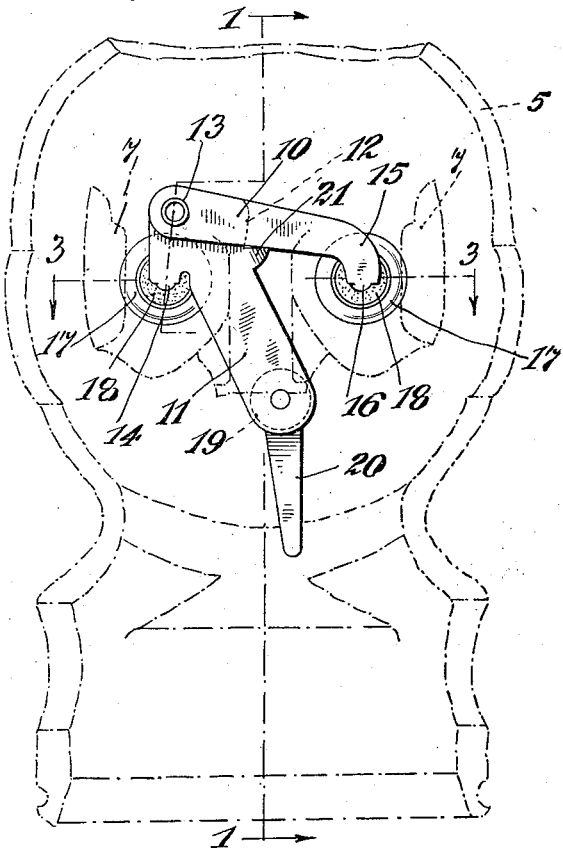
Fig. 2 is a rear elevation.

Referring in detail to the drawing, for purposes of illustration, I have shown a part of a doll head 5, the front wall of which is provided with the usual eye openings indicated at 6 appropriately located with respect to the nose and other molded features of the head structure.

Upon the inner side of the head wall and at the outer end of each of the elliptical shaped eye openings, said wall is molded with a thickened internally protruding section 7 which is milled out on its inner face to provide a concave seat 8 which forms a continuation of the eye member receiving socket 9 formed on the inner side of the front wall of the doll head at each of the eye openings 6.

The eye mounting or setting as herein shown consists of a weighted pendulum frame, which in the present instance may consist of two simple stamped parts of sheet metal in the form of lever members 10 and 11 respectively. The member 11 at one of its ends has a widened rectangular portion 12 from which a tubular stud 13 is punched forming a pivot upon which one end of the other lever member 10 is loosely engaged, the end of said stud 13 being burred or swaged outwardly upon the lever member 10 to hold said lever members to close sliding contact with each other.

The part 12 of the lever member 11 below and in spaced relation to the stud 13 is provided with an arm 14 projecting at right angles to the plane of said lever member from one side thereof, and the other or free end of the lever member 10 is curved as at 15 and provided with a similar arm 16.

As herein shown, the hollow glass eye members 17 are open at their rear ends and filled with a cementitious or thermo-plastic material indicated at 18 in which the arms 14 and 16 of the respective lever members are embedded or anchored, thereby securely holding said eye members in fixed relation to the respective lever members.

The other or lower end of the lever member 11 is provided with a suitable weight 19 and a downwardly extending resiliently yieldable stop member 20, the free end of which is adapted to contact with the neck wall of the doll head.

The lever member 11 is further provided at its inner longitudinal edge and in properly spaced relation from the pivot stud 13 with a resiliently yieldable lip or projection 21 which is positioned in the plane of the lever member 10 and beneath the lower end, to limit the relative pivotal movement of these lever members towards each other.

Figure 4:
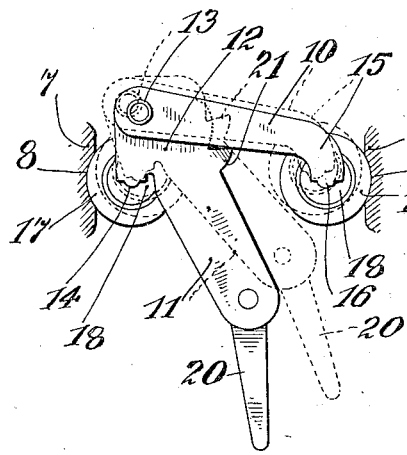
Fig. 4 is a detail view illustrating in dotted lines the initial position of the relatively movable parts and the eye members in applying the mounting, and showing said parts and the eye members in full lines after the latter have been engaged with the supporting seats.
Figure 3:
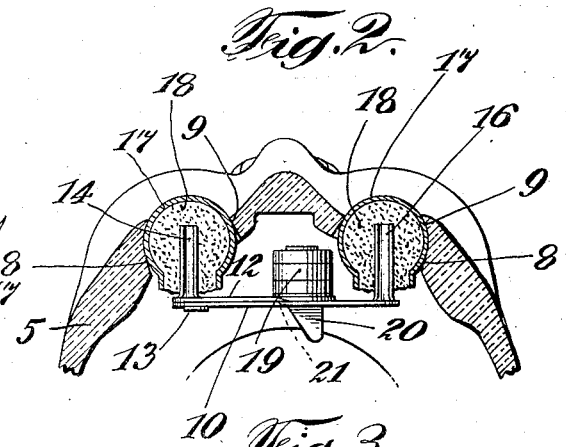
Fig. 3 is a sectional view taken on the line 3—3 of Fig. 2.

In the application of the eye setting above described to its operative position in the doll head, the lever members are sprung away from each other so as to permit the member 10 to ride over the yieldable lip 21, said members being then moved towards each other as indicated in dotted lines in Fig. 4 of the drawings, thus also moving the two eye members inwardly towards each other and reducing the distance between the outer sides of said eye members. This distance is then less than the distance between the inner faces of the projections 7 on the doll head wall so that the setting may be inserted upwardly in the hand through the neck opening of the doll head and the eye members readily positioned between the seats 8. The lever members 10 and 11 are then pivotally moved apart relative to each other, by simply forcing the lever member 10 upwardly with the finger until the resilient tongue 21 snaps beneath the lower edge of the lever member 10.

In this relative movement of the lever members, the two eye members carried thereby are moved laterally outward relative to each other and into contact with the concave seats 8 and the walls of the eye sockets 9. It will be observed that the center of gravity of the weight 19 is in laterally spaced relation from the pivot 13 and between the two eye members 17 so that there is a constant tendency of this weight to move by gravity laterally into line with the pivot stud 13 and urge the two lever members 10 and 11 apart, thereby insuring a proper frictional contact of the eye members with the seats 8, notwithstanding change or variation in the distance between these seats due to shrinkage in the wall structure of the doll head. Accordingly, the eye members will at all times be properly retained for vertical oscillation in their sockets and held against inward or rearward movement by the walls of the seats 8 to such position that the setting would become entirely displaced from its operative position relative to the eye openings 6. Also, it will be apparent that an eye setting of this kind may be interchangeably used in connection with different doll heads having the seats 8 for the eye members, notwithstanding the fact that in the different heads, the space or distance between these seats may vary. Further, it will be seen that a device of this kind particularly lends itself for use in connection with glass eye members since individual adjustment of these eye members relative to the metal parts of the mounting in order that the pupils of the eye members may be accurately positioned relative to the respective eye openings 6, is unnecessary, and the use of special fastening or attaching means for retaining the setting in its operative position upon the doll head wall is avoided, thus practically eliminating the liability of breakage of the eye members in applying the device to its operative position.

When for any reason, it may be necessary to remove the eye setting from the doll head, this can be easily and quickly accomplished by simply inserting the hand upwardly through the neck opening of the doll head and grasping the two lever members with the fingers and exerting pressure to displace the spring lip 21 so that these lever members may be relatively moved to the dotted line positions of Fig. 4, thus disengaging the eye members from the seats 8. The device may then be readily withdrawn through the neck opening of the doll head.

In the foregoing description and accompanying drawings, I have described and illustrated a practical embodiment of my present invention which has given excellent results in actual practice. It will, however, be understood that certain variations may be made in the form and construction of the lever members and the means for connecting the same with each other as well as the manner of attaching the glass eyes to said lever members. Accordingly, it is to be understood that the essential features of the invention might be incorporated in various other alternative structural forms, and I therefore, reserve the privilege of resorting to all such legitimate changes therein as may be fairly embodied within the spirit and scope of the invention as claimed.

I claim:

1. An oscillatory eye mounting for dolls including spaced eye members, relatively movable parts connecting said eye members with each other, and weight means carried by one of said parts for oscillating the eye members and acting by gravity to move said parts relative to each other and urge the eye members laterally away from each other and into rocking engagement with spaced seats formed on the wall of a doll head.

2. An oscillatory eye mounting for dolls including spaced eye members, relatively movable parts connecting said eye members with each other, weight means carried by one of said parts for oscillating the eye members and acting by gravity to move said parts relative to each other and urge the eye members laterally away from each other and into rocking engagement with spaced seats formed on the wall of a doll head, and means for preventing the reverse relative movement of said parts and the movement of the eye members towards each other and out of engagement with the supporting seats.

3. An oscillatory eye mounting for dolls including a pendulum frame consisting of two lever members pivotally connected with each other at one of their ends, an eye secured upon the other end of one of said lever members, an eye secured to the other lever member below and adjacent the pivotal connection between said lever members, and a weight attached to the other end of the latter lever member having its center of gravity positioned between said eyes and tending to relatively move said lever members and urge the eyes into rocking contact with spaced supporting seats on the wall of a doll head.

4. An oscillatory eye mounting for dolls including a pendulum frame consisting of two lever members pivotally connected with each other at one of their ends, an eye secured upon the other end of one of said lever members, an eye secured to the other lever member below and adjacent the pivotal connection between said lever members, and a weight attached to the other end of the latter lever member having its center of gravity positioned between said eyes and tending to relatively move said lever members and urge the eyes into rocking contact with spaced supporting seats on the wall of a doll head, and one of said lever members having means to coact with the other lever member and prevent pivotal movement of said lever members towards each other and the movement of the eye members out of engagement with the supporting seats.

5. In combination with a doll head having concave seats on its opposite side walls adjacent to eye openings in the front wall of the doll head, an oscillatory eye mounting having relatively movable parts, spaced eye members carried by said parts and movable therewith towards and from each other adapted to be positioned in cooperative relation relative to the respective eye openings and engaged at their outer sides with the seats on the side walls of the doll head, and gravity acting means carried by one of said parts and normally tending to move said parts in one direction relative to each other to urge said spaced eye members into supported engagement with the respective seats.

6. In combination with a doll head having concave seats on its opposite side walls adjacent to eye openings in the front wall of the doll head, an oscillatory eye mounting having relatively movable parts, spaced eye members carried by said parts and movable therewith towards and from each other adapted to be positioned in cooperative relation relative to the respective eye openings and engaged at their outer sides with the seats on the side walls of the doll head, gravity acting means carried by one of said parts and normally tending to move said parts in one direction relative to each other to urge said spaced eye members into supported engagement with the respective seats, and means limiting the reverse relative movement of said parts to prevent inward movement of the eye members towards each other and out of bearing contact upon said seats.

7. An oscillating eye mounting for dolls including spaced eye members, and connecting means between said eye members embodying relatively movable parts and means connecting each part to an eye member, and means pivotally connecting said parts with each other positioned above a horizontal plane extending through the centers of said eye members and permitting of relative angular movement of said parts whereby said eye members may be moved relative to each other into and out of rocking engagement with bearing seats on the wall of a doll head.

8. An oscillating eye mounting for dolls including spaced eye members, and connecting means between said eye members embodying relatively movable parts and means connecting each part to an eye member, and means pivotally connecting said parts with each other positioned above a horizontal plane extending through the centers of said eye members and permitting of relative angular movement of said parts whereby said eye members may be moved relative to each other into and out of rocking engagement with bearing seats on the wall of a doll head, and pendulum means connected with one of said parts and extending below the eye members for oscillating said eye members upon the bearing seats when the doll head is tilted.

In testimony that I claim the foregoing as my invention, I have signed my name hereto.

LEO J. GRUBMAN.